(12) United States Patent
Gollier

(10) Patent No.: US 9,454,031 B2
(45) Date of Patent: Sep. 27, 2016

(54) MULTI-COLORED PIXELATED DISPLAY WITH SPARKLE REDUCTION SURFACE

(71) Applicant: Jacques Gollier, Painted Post, NY (US)

(72) Inventor: Jacques Gollier, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 989 days.

(21) Appl. No.: 13/651,652

(22) Filed: Oct. 15, 2012

(65) Prior Publication Data
US 2013/0127689 A1    May 23, 2013

Related U.S. Application Data

(60) Provisional application No. 61/561,011, filed on Nov. 17, 2011.

(51) Int. Cl.
*G02F 1/1335* (2006.01)
*G02B 5/02* (2006.01)
*G02B 5/18* (2006.01)

(52) U.S. Cl.
CPC ....... *G02F 1/133504* (2013.01); *G02B 5/0215* (2013.01); *G02B 5/1842* (2013.01); *G02F 1/133502* (2013.01); *G02F 2001/133562* (2013.01); *G02F 2201/305* (2013.01)

(58) Field of Classification Search
CPC ...... G02B 5/02; G02B 5/0205; G02B 5/021; G02B 5/0252; G02B 5/0257; G02B 5/0263; G02B 5/0273; G02B 5/0278; G02B 5/0294; G02B 5/18; G02B 2005/1804; G02B 5/1809; G02B 5/1814; G02B 5/1819; G02B 5/1823; G02B 5/1828; G02B 5/1833; G02B 5/1838; G02B 5/1842; G02B 5/1847; G02B 5/1852; G02B 5/1857; G02B 5/1861; G02B 5/1866; G02B 5/1871; G02B 6/3534; G02B 26/0808; G02B 27/0056; G02F 1/133502; G02F 1/133504; G02F 2201/305; G02F 2201/30; G02F 2201/307; G02F 2203/22
USPC ........... 359/558–576, 601; 349/64, 104–109, 349/112, 137; 362/235, 246, 311.01
See application file for complete search history.

(56) References Cited

U.S. PATENT DOCUMENTS

| | | | |
|---|---|---|---|
| 6,483,613 B1 * | 11/2002 | Woodgate | G02B 5/1876 349/104 |
| 8,379,172 B2 | 2/2013 | Nagata et al. | |

(Continued)

OTHER PUBLICATIONS

International Searching Authority; International Search Report; Mailing Date: Feb. 1, 2013; pp. 1-2.
The State Intellectual Property Office of The People's Republic of China; Notice on the First Office Action for CN Application No. 201280056637.1; Date of Dispatch: Nov. 10, 2015; pp. 1-5.

(Continued)

*Primary Examiner* — Scott J Sugarman
*Assistant Examiner* — Alberto Betancourt
(74) *Attorney, Agent, or Firm* — Gregory V. Bean

(57) ABSTRACT

Multi-colored pixelated displays are provided where a sparkle reduction surface comprising a micron grade diffraction element is positioned between the image display element and the display surface. More specifically, in accordance with one embodiment of the present disclosure, a multi-colored pixelated display is provided comprising an image display element and a transparent display cover. The image display element comprises an array of display pixels divided into a plurality of display sub-pixels associated with respective dedicated display color components. The transparent display cover comprises a display surface that is susceptible to marking and a sparkle reduction surface. The sparkle reduction surface is positioned between the image display element and the display surface along an optical path of the pixelated display and is spaced from the image display element by an optical distance D. The sparkle reduction surface comprises a micron grade diffraction element.

20 Claims, 1 Drawing Sheet

(56) References Cited

U.S. PATENT DOCUMENTS

2010/0110524 A1    5/2010    Gollier ......................... 359/279
2010/0277705 A1   11/2010    Gollier ......................... 353/121
2011/0062849 A1*  3/2011    Carlson .................. C03C 3/093
                                                                               313/110
2012/0300307 A1   11/2012    Borrelli et al.

OTHER PUBLICATIONS

European Patent Office; Supplementary Search Report for EP Application No. EP12849087; Date of Completion of Search: Nov. 11, 2015; pp. 1-7.

* cited by examiner

MULTI-COLORED PIXELATED DISPLAY WITH SPARKLE REDUCTION SURFACE

This application is related to U.S. Provisional Application Ser. No. 61/490,706, filed May 27, 2011, but does not claim priority thereto. This application claims the benefit of priority under 35 USC §119 of U.S. Provisional Application Ser. No. 61/561,011 filed Nov. 17, 2011 the content of which is relied upon and incorporated herein by reference in its entirety.

BACKGROUND

The present disclosure relates to pixelated displays and, more particularly, to sparkle reduction technology for use in pixelated displays.

Pixelated displays such as liquid crystal displays (LCDs) and organic light emitting diodes (OLEDs) are widely used in a variety of information, communication, and entertainment devices. Display "sparkle" is a generally undesirable side effect that can occur when the display surface is scratched, soiled, or otherwise marked and typically manifests itself as bright, dark, and/or colored grains or spots, at approximately the pixel-level size scale, the pattern of which typically appears to shift with changing viewing angle.

BRIEF SUMMARY

According to the subject matter of the present disclosure, multi-colored pixelated displays are provided where a sparkle reduction surface comprising a micron grade diffraction element is positioned between the image display element and the display surface.

More specifically, in accordance with one embodiment of the present disclosure, a multi-colored pixelated display is provided comprising an image display element and a transparent display cover. The image display element comprises an array of display pixels divided into a plurality of display sub-pixels associated with respective dedicated display color components. The transparent display cover comprises a display surface that is susceptible to marking and a sparkle reduction surface. The sparkle reduction surface is positioned between the image display element and the display surface along an optical path of the pixelated display and is spaced from the image display element by an optical distance D. The sparkle reduction surface comprises a micron grade diffraction element.

In accordance with another embodiment of the present disclosure, the image display element comprises an array of display pixels arranged at a pixel pitch x and divided into a plurality of display sub-pixels associated with respective dedicated display color components. The display sub-pixels of an individual display pixel are associated with a dedicated display color component, one of which lies at a wavelength $\lambda_G$ between approximately 490 nm and approximately 570 nm. The sparkle reduction surface comprises a micron grade diffraction element characterized by a diffraction period T approximating the relation $$T = \lambda_G / \tan^{-1}\frac{\Delta x}{D}$$

where $$\frac{1}{6}x \leq \Delta x \leq \frac{1}{2}x.$$

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
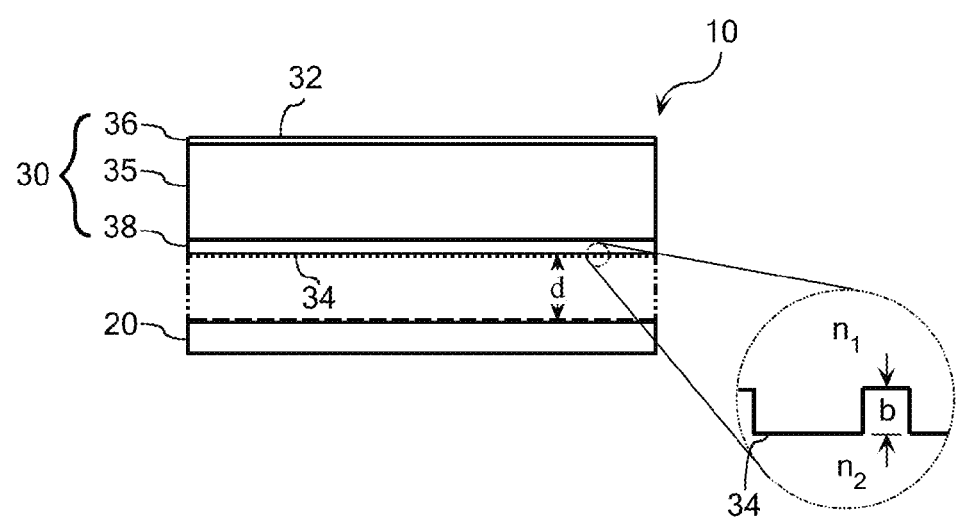
FIG. 1 illustrates a pixelated display according to one embodiment of the present disclosure.

A multi-colored pixelated display 10 according to one embodiment of the present disclosure is illustrated in FIG. 1 and comprises an image display element 20 and a transparent display cover 30 spaced from the image display element 20.

Figure 3:
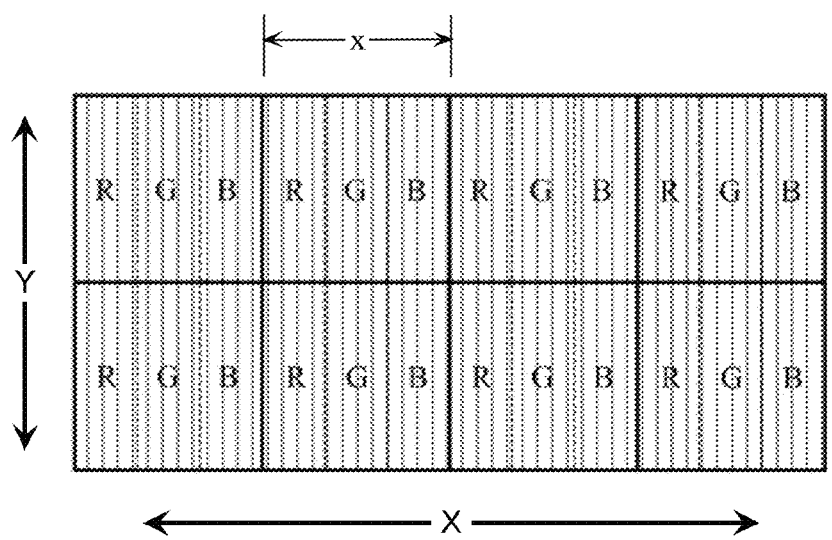
FIG. 3 illustrates an advantageous orientation of the periodic diffraction elements of a sparkle reduction surface utilized in pixelated displays according to the present disclosure.

The image display element 20 comprises an array of display pixels that are each divided into a plurality of display sub-pixels associated with respective dedicated display color components. For example, FIG. 3 shows an embodiment where an array of display pixels are each divided along the X direction into three sub-pixels, one each for the red (R), green (G), and blue (B) color components of the display. In pixelated displays such as LCD displays or the like, color images are generally created by using adjacent red (R), green (G), and blue (B) sub-pixels. These sub-pixels are approximately one third of the size (or pitch) of the pixel in the X direction and are equal to the size of the pixel in the Y direction. As a consequence of this type of geometry, single color images will constitute sub-pixels with a gap of about ⅔ of the pixel size. This inter-pixel gap is responsible for creating some degree of sparkle in images generated by a plurality of pixels. If no inter-pixel gap were present or perceived by a viewer, sparkle would not be easily observed.

It will be appreciated by those skilled in the art that the present disclosure encompasses pixel and sub-pixel geometries other than that shown in FIG. 3. Other pixel geometries include, but are not limited to: sub-pixels of unequal dimensions, e.g., a blue sub-pixel that is twice as large as the red and green sub-pixels to compensate for low-brightness of a blue light source); non-rectangular sub-pixels; pixels with more than three sub-pixels, including sub-pixels of non-standard colors, e.g., RGB plus white; sub-pixels in which there are further subdivisions within each sub-pixel; and sub-pixels that are arranged in configurations that have more complex geometry than that shown in FIG. 3.

The transparent display cover 30 comprises a display surface 32 that is susceptible to marking and a sparkle reduction surface 34. For example, and not by way of limitation, the display surface may comprise the surface of a coated or uncoated glass substrate 35 of a soda lime glass, an alkali aluminosilicate glass, an alkali aluminoborosilicate glass, or combinations thereof. In other embodiments, the display cover 30 comprises a transparent sheet of polymeric material such as, but not limited to, a polycarbonate sheet or the like. The transparent display cover 30 may be a flat sheet or a three dimensional sheet such as, for example, a curved sheet.

In one embodiment, the display surface comprises an anti-glare surface 36 formed over the glass substrate 35 to enhance viewability of the display by reducing the specular reflection of ambient light. Such antiglare surfaces are typically formed by providing the display cover 30 with some degree of roughness to spread the light reflected by the surface over a certain angle. This may be accomplished, for example, by applying a film having a roughened surface or texture, or by roughening the native surface of the substrate.

The sparkle reduction surface 34 is positioned between the image display element 20 and the display surface 32 along an optical path of the pixelated display and is spaced from the image display element by an optical distance D, which is equivalent to the physical distance d multiplied by the optical refractive index of the region spanned by the physical distance d.

The sparkle reduction surface 34 is formed by a micron grade diffraction element 38 which, for the purposes of the present disclosure, is characterized by a diffraction period on the order of microns, tens of microns, or hundreds of microns. The diffraction element 38 may be formed integrally with the glass substrate 35 or may comprise a component added to the glass substrate 35 and is an optical element that modifies light according to the laws of diffraction. For example, and not by way of limitation, in some embodiments, the diffraction element 38 comprises a periodic grating or texture. It is contemplated that the diffraction element 38 may comprise a periodic grating, a quasiperiodic grating, an aperiodic grating, or a random phase pattern that reduces sparkle by filling gaps between sub-pixels in a pixelated display. It is also contemplated that the grating may be sinusoidal or square-shaped.

Each sub-pixel R, G, B of the pixelated display 10 is duplicated into three images corresponding to the −1, 0 and +1 orders of diffraction by the diffraction element 38, which are preferably equal in amplitude to preserve display homogeneity. Those duplicate images are shifted along the X-axis (FIG. 1) by an amplitude or displacement equal in first approximation to:

$$\Delta x = D \tan \theta$$

where $\theta = \lambda/T$, dx is the lateral displacement, D is the optical distance from the pixel to the diffraction element 38, $\theta$ is the diffraction angle, $\lambda$ is the wavelength, and T is the diffraction period. As a result, given an array of display pixels arranged at a pixel pitch x, the diffraction element 38 can be configured to define a diffraction period T approximating the relation $$T = \lambda_G / \tan^{-1} \frac{\Delta x}{D}$$

where $\Delta x$ represents a desired pixel image shift and $\lambda_G$ represents a target color component. Typically, $\lambda_G$ will represent the green portion of the visible spectrum, i.e., between approximately 490 nm and approximately 570 nm because, as recognized by the present inventor, the human eye is most sensitive to sparkle in this band (about 70% of the brightness in a white image is created by green sub-pixels). In addition, the present inventor has recognized that, in many cases, desired pixel image shifts $\Delta x$ should approximate the following relation $$\Delta x \approx (a \pm 10\%) x$$

where a represents an approximate duty factor of the dedicated display color component at the wavelength $\lambda_G$.

For pixelated displays similar to that illustrated schematically in FIG. 3, where the pixel duty factor along the X direction is approximately 33%, desired pixel image shifts $\Delta x$ will typically approximate the following relation $$\frac{1}{6} x \leq \Delta x \leq \frac{1}{2} x.$$

More generally, noting that the diffraction element impacts resolution of the image viewed through the transparent cover 30, and that sparkle reduction should be balanced against pixel blurring, it is contemplated that the diffraction grating period T may be selected to provide a pixel image shift $\Delta x$ that is either slightly greater than or slightly less than, i.e., within ±10% of, ⅓ of the pixel size x in order to balance sparkle reduction and blurring. Preferred diffraction elements are typically characterized by a diffraction periods T between approximately 5 microns and approximately 50 microns. When the periodic structure has more than three orders of diffraction, the extreme orders of diffraction must have higher amplitudes than the central orders in order to achieve the same homogeneous image spread.

Some typical grating periods corresponding to different types of displays are listed in the Table 1 for gratings having three orders of diffraction. The grating period has been calculated for a wavelength $\lambda$ of 530 nm.

| Display Type | Optical Distance, D (mm) | Pixel Pitch (mm) | Grating Period (μm) |
| --- | --- | --- | --- |
| Laptop | 1.0 | 0.191 | 8.35-16.2 |
| Hand Held Device | 2.4 | 0.194 | 19.8-39.6 |
| Retina Display | 1.2 | 0.078 | 24.5-49 |

In high resolution displays, for example, the pixel size is about 75 μm. Optimizing the parameters of display system for green and assuming an optical distance D of 3 mm, the diffraction angle is 8.3 mRd (0.48 degrees) corresponding to a grating period of 63.8 μm. Assuming an air gap with refractive index n=1 between the pixelated display and that the diffraction element comprises a periodic sinusoidal grating, the optimum amplitude of the roughness is 0.48 μm, which corresponds to a relatively shallow surface profile, i.e., the grating amplitude is about one hundredth of the grating period.

In other embodiments, the diffraction element may comprise a random phase pattern. The random phase pattern may have a cutoff frequency such that the diffusion angular energy distribution is a rectangular distribution with a diffraction cone equal to the pixel size divided by the optical distance D from the pixel to the sparkle reduction surface.

Although the various embodiments described herein relate primarily to diffraction elements obtained by surface texturing, it is contemplated that diffraction elements according to the present disclosure may also comprise components having bulk scattering properties. For example, the diffraction element may comprise a portion of transparent substrate in which the index of refraction of the transparent substrate has been modified, e.g., by ion exchange of a glass substrate through a mask, to create local variations in the index of refraction. When light propagates through the substrate, those local variations induce phase modulation into the optical waves, thus creating diffraction effects similar to surface texturing.

FIG. 3 also illustrates a preferred manner of orienting diffraction elements according to the present disclosure. Specifically, FIG. 3 illustrates a multi-colored pixelated display where the display sub-pixels R, G, B are arranged within respective pixels of the display to define an anisotropic display, i.e., a display with fractional color component duty factors along the direction X and color component duty factors approaching 100% along the direction Y. For anisotropic displays, it is contemplated that the diffraction element of the sparkle reduction surface will preferably comprise a diffraction grating characterized by a grating period that is spaced along the direction X, as is illustrated schematically in FIG. 3. In this configuration, the greatest degree of sparkle reduction may be achieved without compromising too much image resolution.

Figure 2:
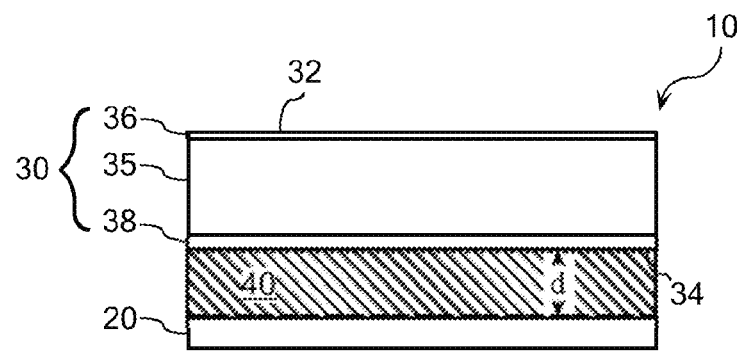
FIG. 2 illustrates a pixelated display according to another embodiment of the present disclosure.

FIG. 2 illustrates an additional embodiment where a pixelated display 10' further comprises a partial index matching medium 40 contacting the sparkle reduction surface 34. For example, the partial index matching medium 40 may comprise an epoxy extending from the sparkle reduction surface 34 to the display element 20. The partial index matching medium 40 is selected to have a refractive index that partially matches that of the diffraction element 38 in order to eliminate Fresnel reflections at the sparkle reduction surface and the surface of the display element. The partial index matching medium 40 has a refractive index that differs from that of the diffraction element 38 but defines an index contrast that is sufficiently low to attenuate the Fresnel reflection. At the same time, the index contrast is large enough to keep the roughness amplitude of the sparkle reduction surface 34 at reasonable levels. With an index contrast of 0.05, for example, the amplitude of the Fresnel reflection is around 0.04% and the ideal grating amplitudes are 4.8 µm and 3.4 µm for sinusoidal and square gratings, respectively. Given relatively large periods on the order of 20 µm to 40 µm, such amplitudes are achievable for grating manufacturing processes such as microlithography, embossing, replication, or the like. For example, it is contemplated that the partial index matching medium 40 and the sparkle reduction surface 34 of the transparent display cover 30 may define an index contrast of between approximately 0.02 and approximately 0.3 and a reflection coefficient on the order of approximately 0.03%.

Referring to the expanded portion of FIG. 1, in some embodiments of the present disclosure, it may be preferable to engineer the diffraction element 38 such that the diffraction element depth b and the diffraction element index of refraction $n_1$ are selected such that the phase modulation amplitude in reflection $\Phi_R$ approximates an integer multiple of a given target wavelength, i.e., a wavelength $\lambda_G$ between approximately 490 nm and approximately 570 nm, where $$\Phi_R = 2n_1 b.$$

By doing so, the diffraction element can be tailored to limit the amplitude of image degrading scattered light while still preserving the advantageous effects of the sparkle reduction surface 34.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present disclosure it is noted that the terms "about" and "approximately" are utilized herein to represent the inherent degree of uncertainty that may be attributed to any quantitative comparison, value, measurement, or other representation. The terms "about" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A multi-colored pixelated display comprising an image display element and a transparent display cover, wherein:
   the image display element comprises an array of display pixels each divided into a plurality of display sub-pixels each associated with a respective dedicated display color component, wherein the sub-pixels of a given color component, across multiple display pixels, form a sub-pixel array of that given color component;
   the transparent display cover comprises a display surface that is susceptible to marking and a sparkle reduction surface;
   the sparkle reduction surface is positioned between the image display element and the display surface along an optical path of the pixelated display and is spaced from the image display element by an optical distance D;
   the sparkle reduction surface comprises a micron grade diffraction element comprising a texture that spreads in at least one direction the energy emitted by sub-pixels over a distance $X_1$ which, at the display surface, is larger than the size of a sub pixel and smaller than or equal to the pitch x of the array of display pixels, wherein the size of the sub pixel is approximately one third the pitch x, such that $$\frac{1}{3}x \le X_1 \le x;$$

and
wherein the diffraction element is characterized by a diffraction period T between approximately 5 microns and approximately 50 microns.

2. A multi-colored pixelated display as claimed in claim 1 wherein respective sub-pixel arrays have a linear duty factor that varies according to the linear direction, along the array of display pixels, in which the linear duty factor is measured or calculated, and wherein said variation of the linear duty factor includes a minimum linear duty factor along a given linear direction, and wherein the energy emitted by sub-pixels is preferentially spread in the given linear direction.

3. A multi-colored pixelated display as claimed in claim 1 wherein:
the array of display pixels are arranged at a pixel pitch x;
one of the dedicated display color components lies at a wavelength $\lambda_G$ between approximately 490 nm and approximately 570 nm;
the diffraction element is characterized by a diffraction period T approximating the relation $$T = \lambda_G / \tan^{-1}\frac{\Delta x}{D}$$

where $$\frac{1}{6}x \le \Delta x \le \frac{1}{2}x,$$

D is the optical distance from the pixels to the diffraction element, and
x is the pixel pitch.

4. A multi-colored pixelated display as claimed in claim 3 wherein the diffraction element is characterized by a diffraction period T where $\Delta x = (\frac{1}{3} \pm 10\%)x$.

5. A multi-colored pixelated display as claimed in claim 3 wherein the diffraction grating element is characterized by a diffraction period T where $\Delta x = (a \pm 10\%)x$ and a represents an approximate duty factor of the dedicated display color component at the wavelength $\lambda_G$.

6. A multi-colored pixelated display as claimed in claim 1 wherein:
the display sub-pixels are arranged within respective pixels to define an anisotropic display with fractional color component duty factors along a direction X; and
the diffraction element of the sparkle reduction surface comprises a diffraction grating characterized by a grating period spaced along the direction X.

7. A multi-colored pixelated display as claimed in claim 1 wherein:
the display sub-pixels are arranged within respective pixels to define an anisotropic display with fractional color component duty factors along a direction X; and
the diffraction element of the sparkle reduction surface comprises periodic diffraction elements spaced along the direction X.

8. A multi-colored pixelated display as claimed in claim 1 wherein the display further comprises a partial index matching medium contacting the sparkle reduction surface and positioned along the optical path between the image display element and the transparent display cover.

9. A multi-colored pixelated display as claimed in claim 8 wherein the partial index matching medium and the sparkle reduction surface of the transparent display cover define an index contrast of between approximately 0.02 and approximately 0.3 and a reflection coefficient on the order of approximately 0.03%.

10. A multi-colored pixelated display as claimed in claim 1 wherein:
the diffraction element of the sparkle reduction surface comprises periodic diffraction elements of depth b; and
the diffraction element depth b and the diffraction element index of refraction $n_1$ are selected such that a phase modulation amplitude in reflection $\Phi_R$ approximates an integer multiple of a wavelength $\lambda_G$ between approximately 490 nm and approximately 570 nm, where $$\Phi_R = 2n_1 b.$$

11. A multi-colored pixelated display as claimed in claim 1 wherein the diffraction element comprises a random phase pattern.

12. A multi-colored pixelated display as claimed in claim 11 wherein the random phase pattern defines a cutoff frequency selected such that a diffusion angular energy distribution of the diffraction element is a rectangular distribution with a diffraction cone equal to pixel size divided by the optical distance D.

13. A multi-colored pixelated display comprising an image display element and a transparent display cover, wherein:
the image display element comprises an array of display pixels arranged at a pixel pitch x and divided into a plurality of display sub-pixels associated with respective dedicated display color components;
the display sub-pixels of an individual display pixel are associated with a dedicated display color component, one of which lies at a wavelength $\lambda_G$ between approximately 490 nm and approximately 570 nm;
the transparent display cover comprises a display surface that is susceptible to marking and a sparkle reduction surface;
the sparkle reduction surface is positioned between the image display element and the display surface along an optical path of the pixelated display and is spaced from the image display element by an optical distance D;
the sparkle reduction surface comprises a micron grade diffraction element characterized by a diffraction period T approximating the relation $$T = \lambda_G / \tan^{-1}\frac{\Delta x}{D}$$

where $$\frac{1}{6}x \le \Delta x \le \frac{1}{2}x.$$

14. A multi-colored pixelated display as claimed in claim 13 wherein:
the display sub-pixels are arranged within respective pixels to define an anisotropic display with fractional color component duty factors along a direction X; and the diffraction element of the sparkle reduction surface comprises periodic diffraction elements spaced along the direction X.

15. A multi-colored pixelated display as claimed in claim 13 wherein the display further comprises a partial index matching medium contacting the sparkle reduction surface and positioned along the optical path between the image display element and the transparent display cover, and wherein a phase modulation amplitude in reflection $\Phi_R$ approximates an integer multiple of a wavelength $\lambda_G$ between approximately 490 nm and approximately 570 nm, where $\Phi_R=2n_1b$.

16. A multi-colored pixelated display as claimed in claim 15 wherein the partial index matching medium and the sparkle reduction surface of the transparent display cover define an index contrast of between approximately 0.02 and approximately 0.3 and a reflection coefficient on the order of approximately 0.03%.

17. A multi-colored pixelated display comprising an image display element and a transparent display cover, wherein:

the image display element comprises an array of display pixels each divided into a plurality of display sub-pixels each associated with a respective dedicated display color component, wherein the sub-pixels of a given color component, across multiple display pixels, form a sub-pixel array of that given color component;

the transparent display cover comprises a display surface that is susceptible to marking and a sparkle reduction surface;

the sparkle reduction surface is positioned between the image display element and the display surface along an optical path of the pixelated display and is spaced from the image display element by an optical distance D;

the sparkle reduction surface comprises a micron grade diffraction element comprising periodic diffraction elements of depth b; and the diffraction element depth b and the diffraction element index of refraction $n_1$ are selected such that a phase modulation amplitude in reflection $\Phi_R$ approximates an integer multiple of a wavelength $\lambda_G$ between approximately 490 nm and approximately 570 nm, where $\Phi_R=2n_1b$.

18. A multi-colored pixelated display as claimed in claim 17 wherein:

the array of display pixels are arranged at a pixel pitch x;

one of the dedicated display color components lies at the wavelength $\lambda_G$ between approximately 490 nm and approximately 570 nm;

the diffraction element is characterized by a diffraction period T approximating the relation $$T = \lambda_G / \tan^{-1} \frac{\Delta x}{D}$$

where $$\frac{1}{6}x \leq \Delta x \leq \frac{1}{2}x,$$

D is the optical distance from the pixels to the diffraction element, and x is the pixel pitch.

19. A multi-colored pixelated display as claimed in claim 17 wherein the diffraction element is characterized by a diffraction period T and where $\Delta x=(\frac{1}{3}\pm10\%)x$ or where $\Delta x \cong (a \pm 10\%)x$ and a represents an approximate duty factor of the dedicated display color component at the wavelength $\lambda_G$.

20. A multi-colored pixelated display as claimed in claim 17 wherein:

the display further comprises a partial index matching medium contacting the sparkle reduction surface and positioned along the optical path between the image display element and the transparent display cover; and the partial index matching medium and the sparkle reduction surface of the transparent display cover define an index contrast of between approximately 0.02 and approximately 0.3 and a reflection coefficient on the order of approximately 0.03%.

* * * * *

UNITED STATES PATENT AND TRADEMARK OFFICE
CERTIFICATE OF CORRECTION

PATENT NO. : 9,454,031 B2
APPLICATION NO. : 13/651652
DATED : September 27, 2016
INVENTOR(S) : Jacques Gollier It is certified that error appears in the above-identified patent and that said Letters Patent is hereby corrected as shown below:

In the Claims

In Column 7, Line 47 (approx.), Claim 5, delete "grating element" and insert -- element --, therefor.

In Column 7, Line 48 (approx.), Claim 5, delete "$\Delta x=(a\pm10\%)x$" and insert -- $\Delta x \cong (a\pm10\%)x$ --, therefor.

Signed and Sealed this
Nineteenth Day of January, 2021

Andrei Iancu
*Director of the United States Patent and Trademark Office*